(12) United States Patent
Apte et al.

(10) Patent No.: US 6,286,000 B1
(45) Date of Patent: Sep. 4, 2001

(54) LIGHT WEIGHT DOCUMENT MATCHER

(75) Inventors: Chidanand Apte, Chappaqua; Frederick J. Damerau, North Salem, both of NY (US); Sholom M. Weiss, Highland Park, NJ (US); Brian F. White, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/203,673

(22) Filed: Dec. 1, 1998

(51) Int. Cl.$^7$ ..................................... G06F 17/30
(52) U.S. Cl. ..................................... 707/5; 707/4
(58) Field of Search ............................. 707/1–8, 10, 102; 712/203

(56) References Cited

U.S. PATENT DOCUMENTS

| 4,958,284 | * | 9/1990 | Bishop et al. ........................ 434/353 |
| 5,465,353 | * | 11/1995 | Hull et al. ............................... 707/5 |
| 5,848,407 | * | 12/1998 | Ishikawa et al. ........................ 707/2 |
| 5,963,940 | * | 10/1999 | Liddy et al. ............................. 707/5 |
| 5,987,457 | * | 11/1999 | Ballard ..................................... 707/5 |
| 6,012,057 | * | 1/2000 | Mayer et al. ............................ 707/6 |

* cited by examiner

Primary Examiner—Thomas Black
Assistant Examiner—Uyen Le
(74) Attorney, Agent, or Firm—McGuireWoods, LLP; Stephen C. Kaufman

(57) ABSTRACT

A lightweight document matcher employs minimal processing and storage. The lightweight document matcher matches new documents to those stored in a database. The matcher lists, in order, those stored documents that are most similar to the new document. The new documents are typically problem statements or queries, and the stored documents are potential solutions such as FAQs (Frequently Asked Questions). Given a set of documents, titles, and possibly keywords, an automatic back-end process constructs a global dictionary of unique keywords and local dictionaries of relevant words for each document. The application front-end uses this information to score the relevance of stored documents to new documents. The scoring algorithm uses the count of matched words as a base score, and then assigns bonuses to words that have high predictive value. It optionally assigns an extra bonus for a match of words in special sections, e.g., titles. The method uses minimal data structures and lightweight scoring algorithms to compute efficiently even in restricted environments, such as mobile or small desktop computers.

10 Claims, 10 Drawing Sheets

LIGHTWEIGHT HELP DESK

SOLUTIONS

COMPONENT  571688CM     RELEASE  [3]  [7]  [0]

HEADLINE SUMMARY: [PHANTOM JOBS]

DETAILED PROBLEM STATEMENT:

Problem: PER CUSTOMER, NON COMMUNICATION, JOBS ATTACHED TO APPN MODES
PROBLEM: Getting non-com jobs showing up under appc device.
ACTION TAKEN: This sounds exactly like sa56012, but I do not see an apar for 370. If she ends the job, they just reappear. She has to vary off the device. They do show up as active/detached.
Action plan: researching.

[SUBMIT]  [CLEAR]  [SAVE]  [RESTORE]     ID [1]

FIG. 4

Matching documents:

1. 5150 Device Active with No Job Attached
   Matching keywords: job, communication, attached, device, active
   Score: 6.42

2. Phantom Jobs Checklist for CS2
   Matching keywords: phantom, job
   Score: 6.34

3. Configuring Parallel Transmission Groups
   Matching keywords: communication, appn
   Score: 6.00

4. 5150 Device Active with No Job Attached
   Matching keywords: job, attached, device, active
   Score: 5.41

5. Host Controller Vary On Pending
   Matching keywords: communication, vary
   Score: 5.33

6. MSGCPI59F1 RCCC100301 Posted for Line Vary On
   Matching keywords: communication, vary
   Score: 5.33

FIG.5

Matching documents:

7. SDLC LU6.2 Switched Connection between AS/400 Systems
   Matching keywords: communication, appc
   Score: 5.05

8. Nonswitched Multipoint SDLC Line: Definitions and Parameter Explanations
   Matching keywords: communication, appc
   Score: 5.05

9. SPLS *APPINIT Printer Device Descriptions Not Created
   Matching keywords: communication, device
   Score: 5.04

10. Passthru Determines the Controller and Device Attributes to Use
    Matching keywords: communication, device
    Score: 5.04

FIG.5A

LIGHT WEIGHT DOCUMENT MATCHER

BACKGROUND OF THE INVENTION

1. Field of the Invention

The present invention generally relates to information retrieval in data processing systems and, more particularly, to a document matcher that matches new documents to a database of stored documents in order to find the most relevant matches.

2. Background Description

The problem of document matching against documents stored in a database has been addressed before, but the previous versions require substantial storage and computing resources. They employ much more complicated document representations and document matching algorithms.

U.S. Pat. No. 4,358,824 to Glickman et al. discloses an office correspondence storage and retrieval system. Keywords are selected from a document using a part of speech dictionary. Comparison between a document and a query uses the part of speech and position of occurrence in the document, the number of pages in a document and whether or not the document includes a month and year. The present invention does not use any of these features.

U.S. Pat. No. 4,817,036 to Millett et al. discloses a computer system and method for data base indexing and information retrieval. In this system, an inverted index of the document data base is computed and stored. Query keywords are looked up in the index and the bit strings are manipulated to produce an answer vector from which the matching documents can be found. Aside from the generic use of key words, this is entirely different from the present invention.

U.S. Pat. No. 5,371,807 to Register et al. discloses a method and apparatus for text classification. This invention describes a system in which the recognized keywords are used to deduce further facts about the document which are then used to compute category membership. The present invention does not use a fact data base for any purpose.

U.S. Pat. No. 5,418,948 to Turtle discloses concept matching of natural language queries with a database of document concepts. In this invention, query words are stemmed and sequences of stems are looked for in a phrase dictionary. The list of stemmed words and found phrases are used as query nodes in a query network which is matched against a document network. The present invention uses neither phrases nor query networks.

U.S. Pat. No. 5,694,559 to Hobson et al. discloses on-line help method and system utilizing free text query. After identifying query keywords, this invention performs disambiguation, and other forms of analysis. Each keyword is then associated with a concept. Each concept has a likelihood of being associated with a help topic. The present invention does not require analysis of identified keywords and does not have a defined set of concepts and probabilities associated with help topics.

SUMMARY OF THE INVENTION

It is therefore an object of the present invention to provide a document matching solution that employs minimal processing and storage and is therefore suitable for installation directly in restricted environments, such as mobile or small desktop computers.

According to the invention, there is provided a lightweight document matcher that matches new documents to those stored in a database. The matcher lists, in order, those stored documents that are most similar to the new document. The new documents are typically problem statements or queries, and the stored documents are potential solutions such as FAQs (Frequently Asked Questions). Given a set of documents, titles, and possibly keywords, an automatic back-end process constructs a global dictionary of unique keywords and local dictionaries of relevant words for each document. The application front-end uses this information to score the relevance of stored documents to new documents. The scoring algorithm uses the count of matched words as a base score, and then assigns bonuses to words that have high predictive value. It optionally assigns an extra bonus for a match of the words in special sections, such as titles. The method uses minimal data structures and lightweight scoring algorithms to compute efficiently even in restricted environments, such as mobile or small desktop computers.

Although the invention is designed for installation in, for example, mobile or small desktop computers, the invention can advantageously run on a large server. The approach taken in the practice of the invention is effective when resources are relatively scarce. What distinguishes the subject invention from traditional search engines are the local dictionary formation in the back-end process, the scoring computation in the front-end process, and the ability to accept as input a text stream of unlimited length.

BRIEF DESCRIPTION OF THE DRAWINGS

The foregoing and other objects, aspects and advantages will be better understood from the following detailed description of a preferred embodiment of the invention with reference to the drawings, in which:

FIG. 4 is the GUI (Graphical User Interface) query panel implemented in the preferred embodiment of the invention;

FIG. 5 is the GUI query response panel implemented in the preferred embodiment of the invention;

DETAILED DESCRIPTION OF A PREFERRED EMBODIMENT OF THE INVENTION

Figure 1:
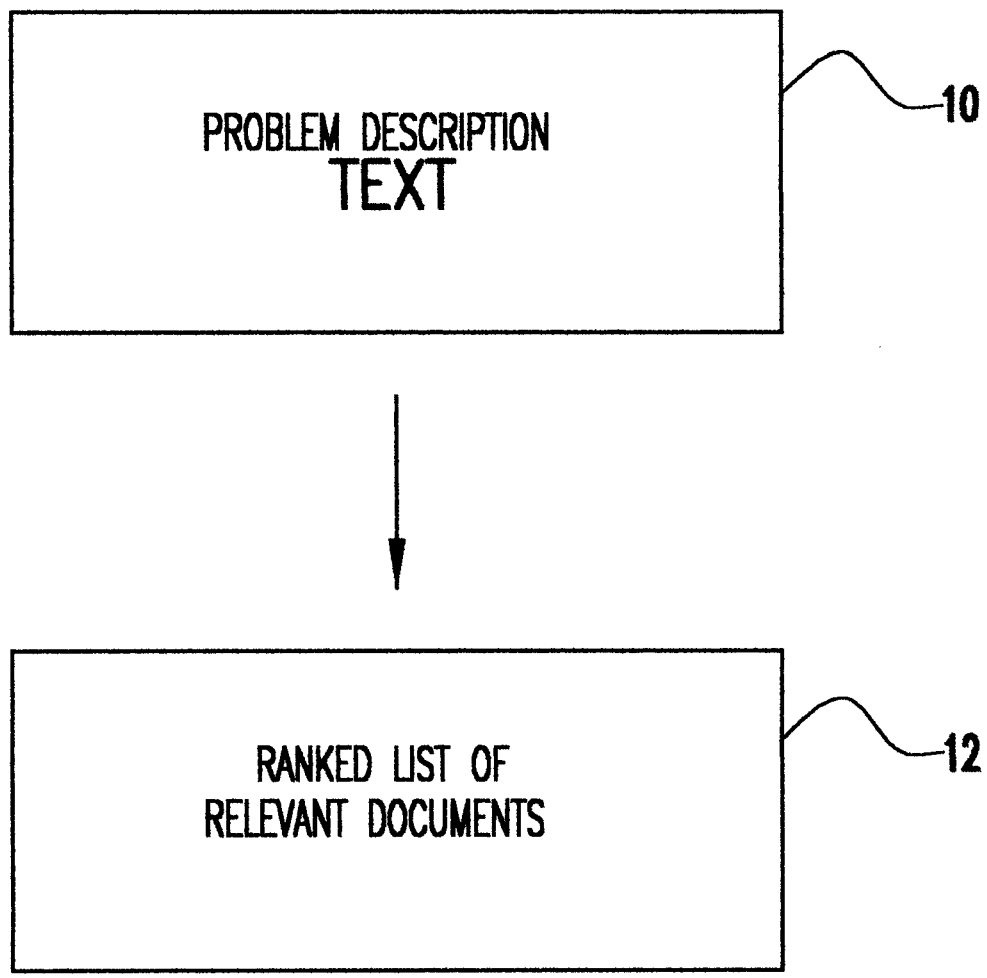
FIG. 1 is a block diagram showing the objective of the present invention.

Referring now to the drawings, and more particularly to FIG. 1, there is shown in block diagram form the objective of the invention. Specifically, the invention receives as input a problem description at 10 and matches new documents to old documents and ranks the documents by assigning a score or relevance at 12. The invention is capable of taking a problem description, which may be just a few words or a long document, and finding relevant documents that may provide a solution. Such a system is useful both for customers and customer service representatives.

Figure 2:
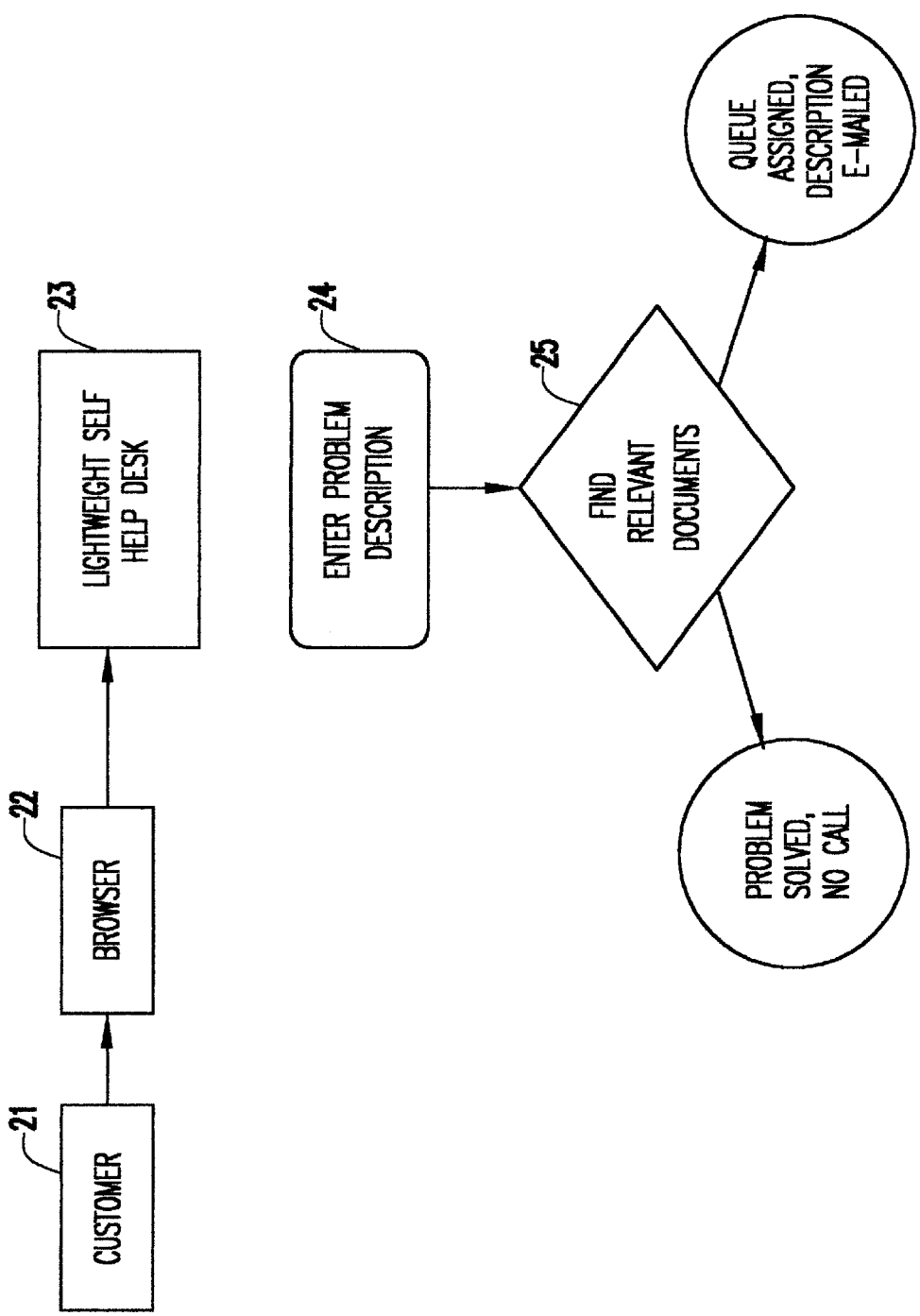
FIG. 2 is a flow diagram showing a help desk scenario implemented in the practice of the invention.

FIG. 2 illustrates one scenario for customer use of the lightweight help desk according to the invention. A customer 21 interfaces with the lightweight help desk 23 via a browser 22. Using the Graphical User Interface (GUI) query panel (see FIG. 4), the user enters a problem description in function block 24. The system accepts as input a stream of text of unlimited length. This could be a document, or a word list, or any textual structure. The function performed by the lightweight help desk is that of a document matcher. The query panel (FIG. 4) shows a typical input to the document matcher. The lightweight help desk finds matching or relevant documents in the database in search block 25 and provides as outputs a list of those documents, as shown in FIG. 5.

The invention uses only some of the available elements of the document for searching, specifically, the title of the document, the keywords assigned to the document, if any, and additional special tags as available, such as product names. These are listed below:

Data Requirements
Documents
Titles
Keywords
    manual—human assigned
    automated—high-frequency words The system does not store or index the full text of the document. The system can accept key words that are manually assigned by humans. Alternatively, a program examines the documents and assigns key words by the following means:

words found in title k most frequent words found in the document (where k is a constant such as 10)

eliminate known useless words (stop words)

For purposes of this invention, a word is a set of contiguous alphanumeric characters, separated by delimiter such as white space or punctuation.

Figure 3:
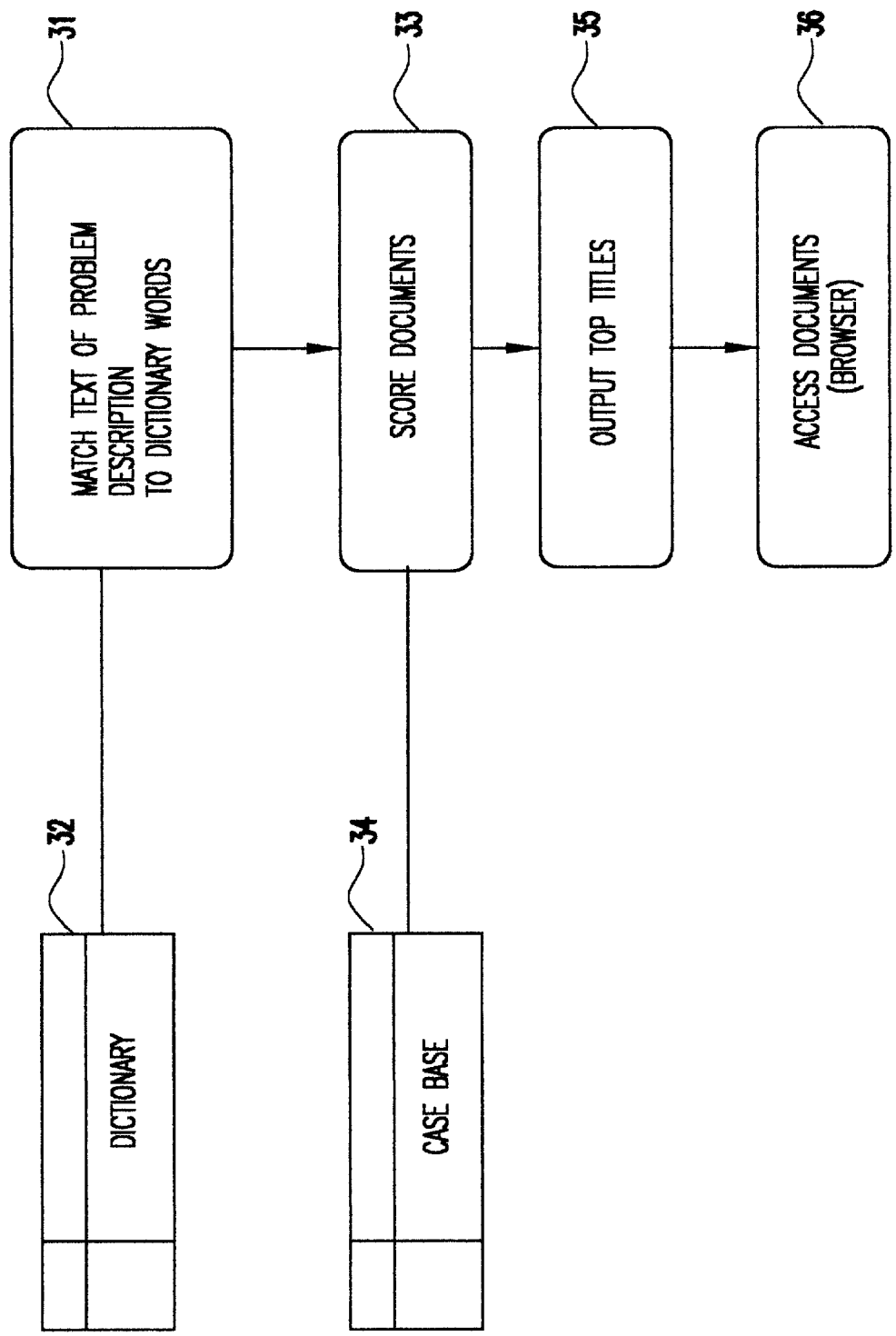
FIG. 3 is a flow diagram illustrating the logic of the algorithm implemented by the invention.

FIG. 3 illustrates the overall process. The first step in the process in function block 31 is to match text of the problem description to dictionary words by accessing the dictionary 32. The documents are scored in function block 33 by accessing case base 34. The output 35 is the top titles. This output can be accessed, using a browser, by the user in block 36.

A back-end program processes the documents, using an XML (eXtensible Markup Language)-style markup language to delineate the parts of the documents relevant to text retrieval and presentation to the end user. An example of the markup for a single document is given below.

<DOC>
<TITLE>
Twinax Tools: DUMP Task
</TITLE>
<KEYWORDS>
twinax tools dmpjob appc
</KEYWORDS>
<COMPONENTS>
5716XA100
5763XA100
5763XC100
5763XD100
5769XW100
5763XK100
5716XW100
5763XW100
</COMPONENTS>
<RELEASES>
ALL
</RELEASES>
<TEXT>
Twinax Tools: DUMP Task This document will contain the required steps to run a Dump Task for the twinax T1 component.

From the STRSST menu, select 1 to Start a service tool, then 4 for Display/Alter/Dump.

Select 2 if you want to Dump to printer

Select 4 Tasks/Processes

Select 1 for Task

Select 5 to Display list of tasks

From the list of tasks, you can choose those starting with T1-or choose another task defined by the developer.

10324314
</TEXT>
</DOC>

Two data structures are derived from the resulting file:

a pooled, global dictionary containing a list of all words that relevant to any document. This is a unique collection of words.

a set of local dictionaries that contains the words that are relevant to specific documents. Typically, 8 to 10 keywords are assigned for each document. The words are not unique to documents; the same word may appear in many documents.

The XML document contains information relevant to document retrieval that is not contained in these two data structures, such as document titles, and possibly application-specific attributes such as component identifiers. A final XML-style extract document incorporates the contents of the local dictionaries with these additional attributes, as illustrated below. The words in the local dictionaries are represented by the internal identifiers used by the object embodying the global dictionary.

<DOC>
<TITLE>
Twinax Tools: DUMP Task
</TITLE>
<KEYWORDS>
573
226
2987
2944
969
2887
915
320
2601
2887
1453
557
</KEYWORDS>
<COMPONENTS>
5716XA100
5763XA100
5763XC100

```
5763XD100
5769XW100
5763XK100
5716XW100
5763XW100
</COMPONENTS>
<RELEASES>
ALL
</RELEASES>
</DOC>
```

These two data structures, a global dictionary and an extract file representing a set of local dictionaries and additional attributes, are sufficient for a lightweight program to score new documents. Unless revised, the dictionaries are created once. They then can be read by an application program that repeatedly matches documents, and the program can be distributed to multiple users.

Given this document representation, a special scoring function is employed to compare a request, entered as key words or as a natural-language document, to the stored document representations. The output is a ranked list of documents which are relevant to the problem entered. Words in the new document are matched to words in the global dictionary. Words must match exactly so that a hash table can be employed for almost immediate lookup in the table. The words in the global dictionary point to the local dictionaries of the stored documents. The outline of the scoring scheme used to rank the stored documents by relevance is provided below.

Base+Bonus
    Base=number of keywords in document
    Keywords=Title and assigned keywords
    Bonus:
        predictive value of word:
            number of documents in which word appears
        title (optional)
        special section keywords, e.g., product (optional)

The output is a ranked list of documents which are relevant to the problem entered.

The base score of each stored document is the number of its local keywords found in the new document. A bonus is then added to the base score. A bonus is given for the predictive value of a word. The predictive value of a word is 1/num, where num is the number of stored documents that contain that word. Two optional bonuses are also used. If a special section keyword identifier is specified within the document, and the new document matches the same keyword, a bonus, typically 1, is added to the score. An example of a Graphical User Interface (GUI) query screen is shown in FIG. 4. The html (hypertext markup language) GUI response screen produced in response to the displayed query is shown in FIG. 5. Not all of these fields are required for all applications. If the text areas are separated into a single one line summary versus a detailed description, then a slight bonus can be optionally assigned to words that appear in the one-line summary, giving extra weight to a "title" effect.

The key differentiation that sets the subject invention apart from traditional search engines are the local dictionary formation in the back-end process, the scoring computation in the front-end process, and the ability to accept as input a text stream of unlimited length. These are described in more detail in the following description.

Figure 6:
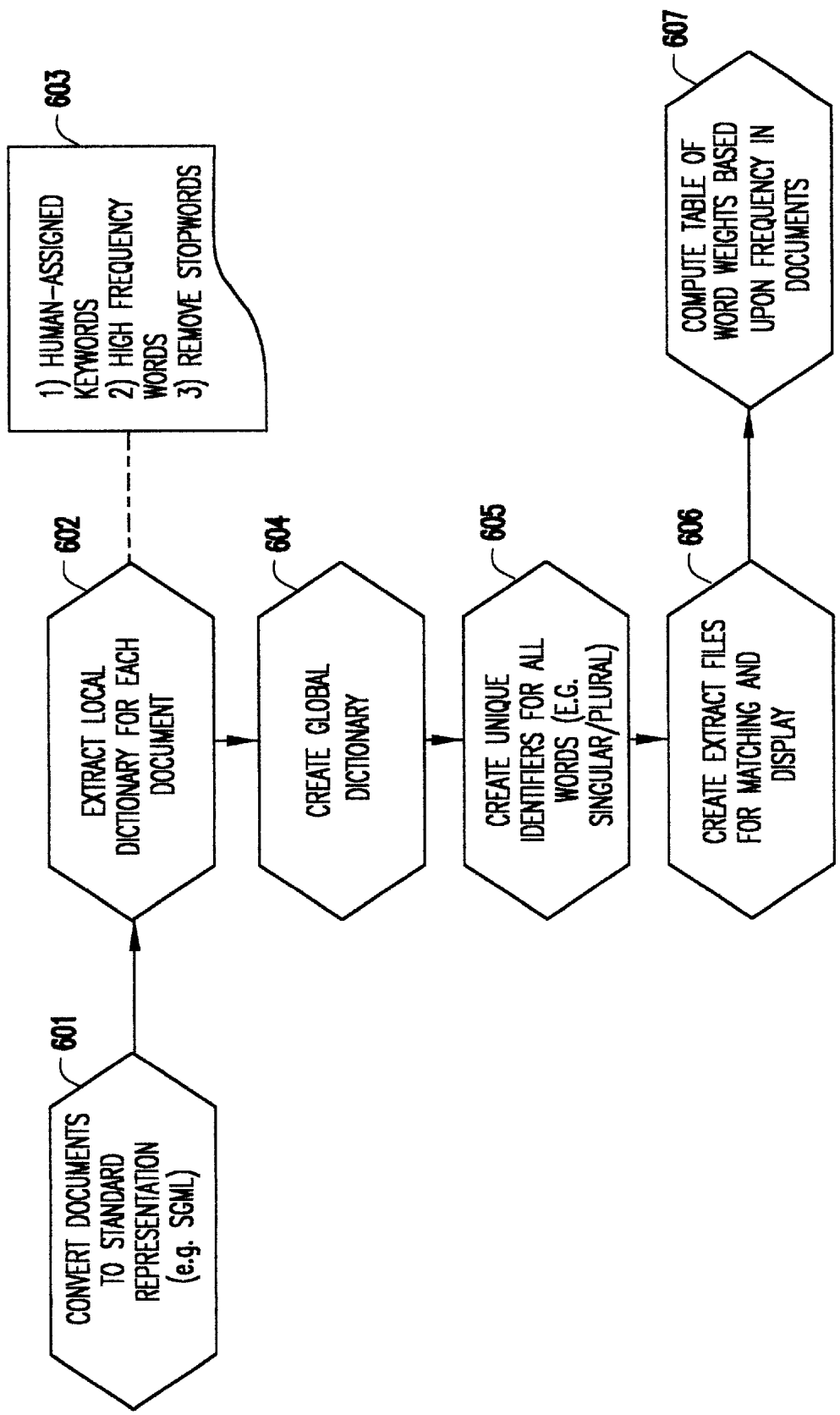
FIG. 6 is a flow diagram illustrating the logic of the back-end process implemented by the invention.

FIG. 6 is a flow diagram of the back-end process. The process begins by converting documents to a standard representation, such as SGML, in function block 601. A local dictionary is extracted for each document in function block 602. This is done using human-assigned keywords, recognizing high frequency of use words, and removal of stop words, as indicated at 603. The next step in the process is to create a global dictionary in function block 604 by combining the local dictionaries. Once the global dictionary has been created, unique identifiers for all words are created in function block 605. Next, extract files are created for matching and display in function block 606. Finally, a table of word weights is computed in function block 607. This computation is based on frequency of use in the documents.

Figure 7:
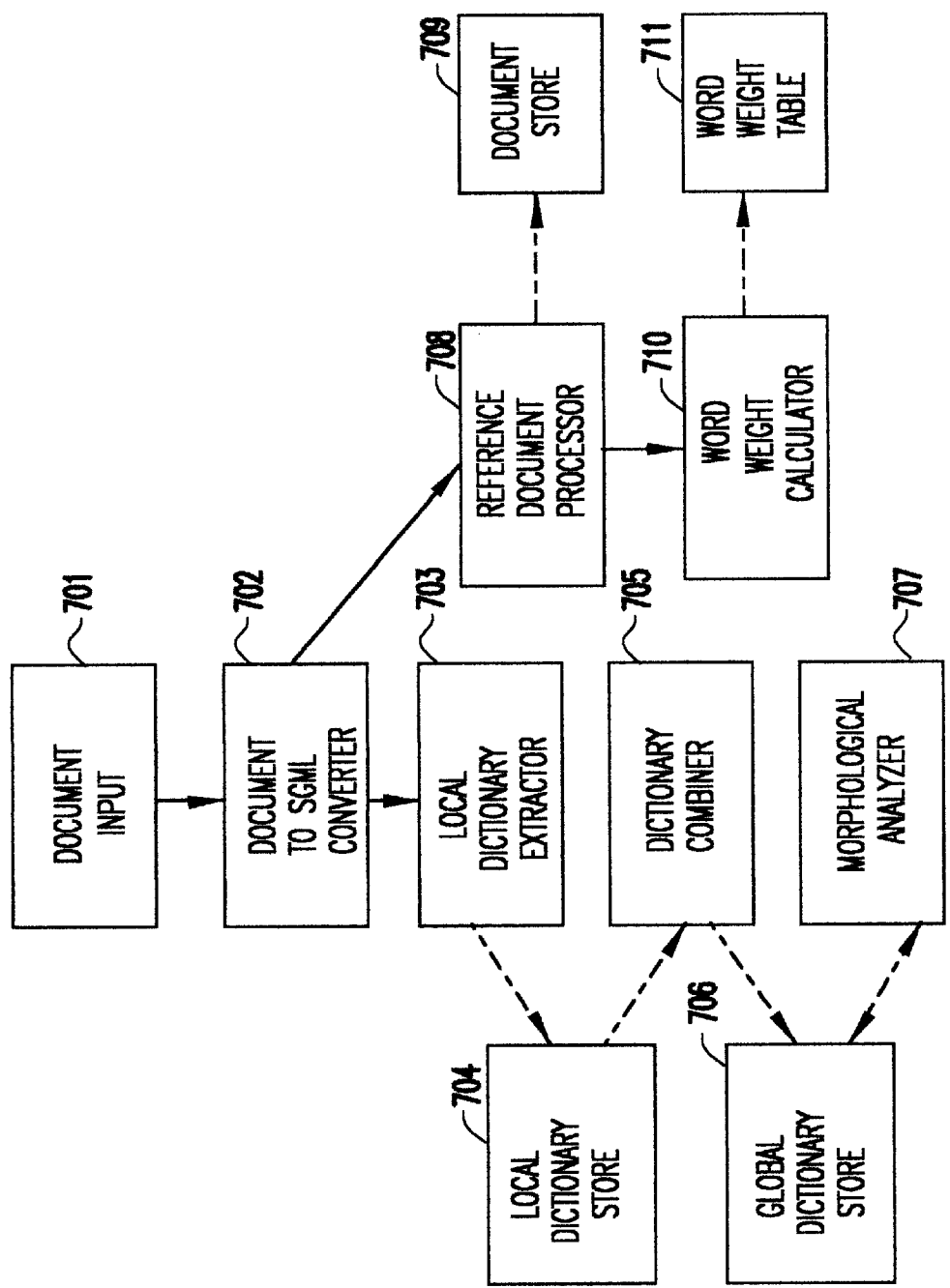
FIG. 7 is a block diagram illustrating the data flow and processing of the back-end processor.

A block diagram of the data flow and processing of the back-end processor is shown in FIG. 7. The document is input at 701 to a document to SGML converter 702. The output of converter 702 is input to a local dictionary extractor 703, and the extracted local dictionary is stored in local dictionary store 704. The several local dictionaries in the local dictionary store 704 are accessed by the dictionary combiner 705 to generate a global dictionary, which is stored in global dictionary store 706. The global dictionary may be optionally further tuned by accessing a morphological analyzer 707. Meanwhile, the converted SGML document is input to a reference document processor 708. A copy of the document is stored in document store 709. A word weight calculator 710 computes a table of word weights, and the table is stored in word weight table 711.

Figure 8:
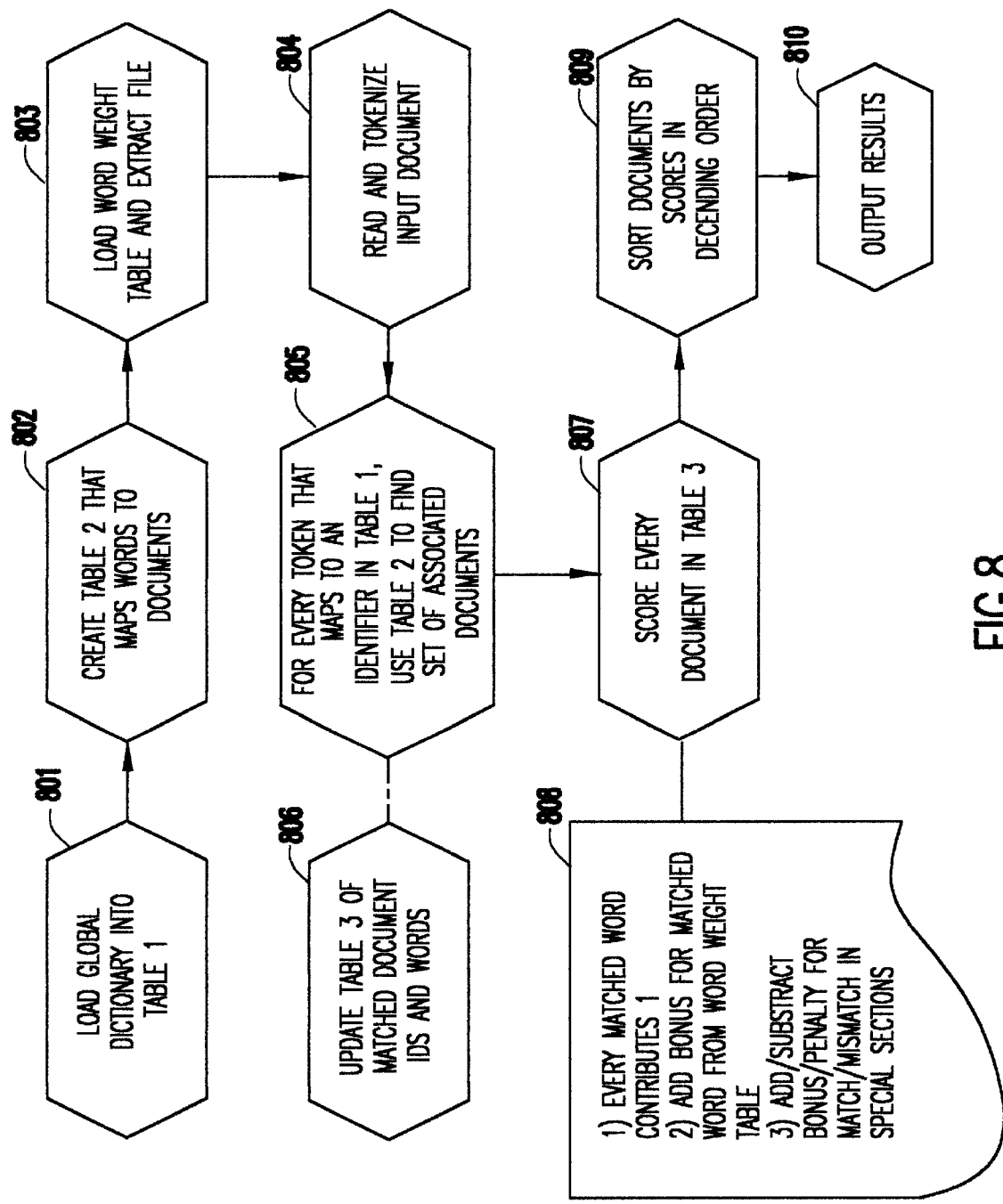
FIG. 8 is a flow diagram illustrating the logic of the front-end process implemented by the invention.

The flow diagram for the front-end processor is shown in FIG. 8. The process begins in function block 801 by loading the global dictionary created by the back-end process into Table 1. A Table 2 is then created that maps words to documents in function block 802. The word weight table created by the back-end processor is loaded in function block 803. The input document is read and tokenized in function block 804. For every token that maps to an identifier in Table 1, Table 2 is used to find a set of associated documents in function block 805. In this process, Table 3 is updated with matched document IDs and words in function block 806. Every document in Table 3 is scored in function block 807. This scoring is done according to the formula that (1) every matched word contributes a value of one, (2) a bonus is added for a matched word from the word weight table, and (3) a bonus (penalty) is added (subtracted) for a match (mismatch) in special sections, as set out at 808. The documents are then sorted by scores in descending order in function block 809 and the results are output at 810.

Figure 9:
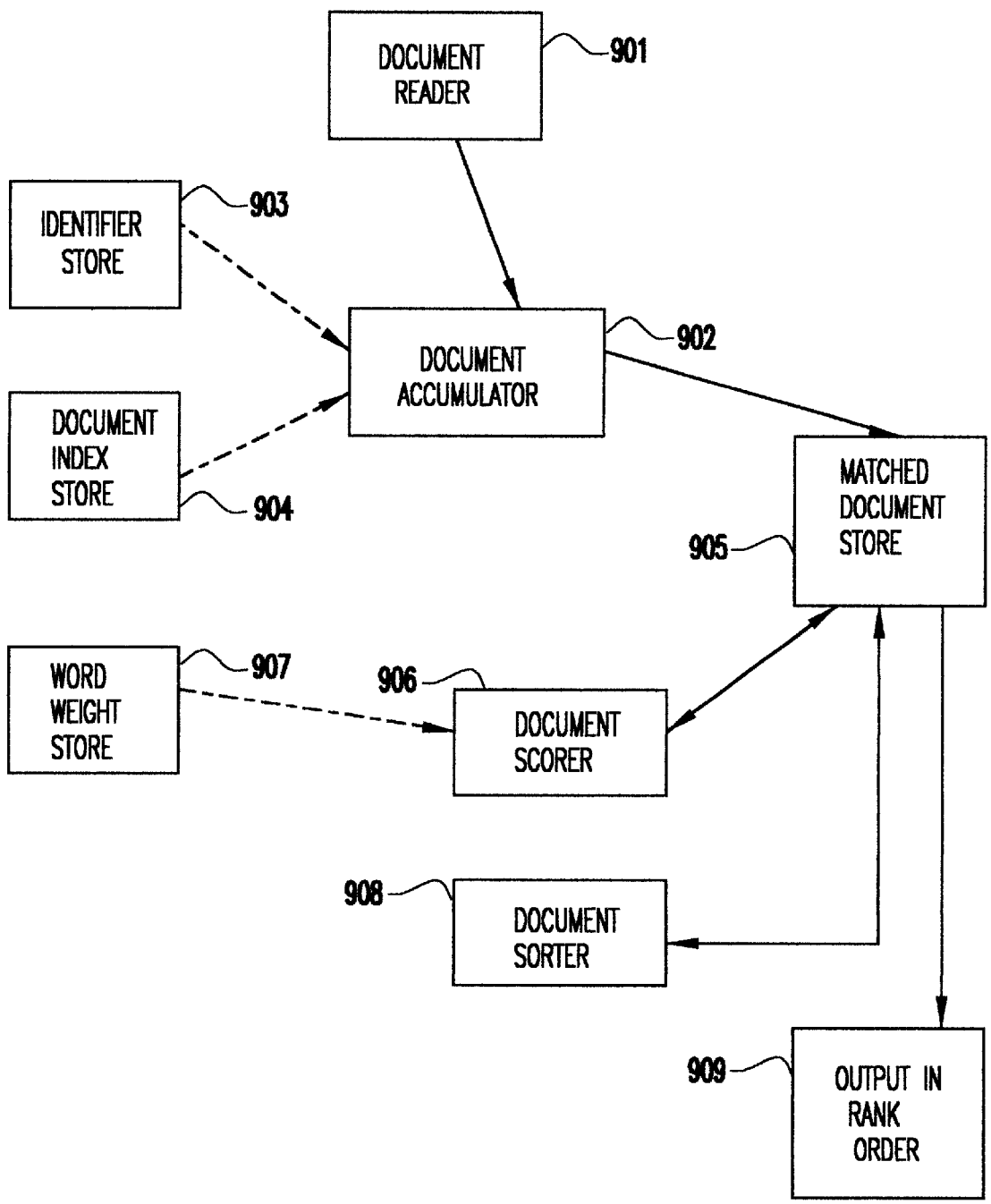
FIG. 9 is a block diagram illustrating the data flow and processing of the front-end processor.

The block diagram showing the data flow and processing of the front-end process is shown in FIG. 9. The output of a document reader 901 is input to a document accumulator 902 which accesses an identifier store 903 and a document index store 904 to provide an output to matched document store 905. The document is scored by document scorer 906, which accesses the word weight store 907 which stores the word weight table of the back-end processor. The scored document is sorted in document sorter 908, and the documents are output in rank order to a display or printer 909.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented document matcher comprising:
    a back-end processor receiving input documents and generating a first data structure consisting of a set of local dictionaries of keywords for each document and then generating a second data structure consisting of a global dictionary resulting from the union of all keywords in the first data structure, said back-end processor computing a table of word weights; and a front-end processor for matching input documents against documents represented by said second data structure, said front-end processor computing a score for the documents, then sorting the documents by score, stored documents being ranked by a relevance scoring scheme according to a formula Base+Bonus, wherein Base is a number of keywords in document, keywords include title words and assigned keywords, and Bonus is a predictive value of word, the predictive value being one divided by a number of documents in which word appears.

2. The computer implemented document matcher recited in claim 1 wherein the back-end processor comprises:

a converter for converting an input document to a standard representation;

a local dictionary extractor and store which receives the standard representation from the converter and generates the first data structure;

a dictionary combiner and global dictionary store which accesses the first data structure stored in the local dictionary extractor and store to generate the second data structure; and a word weight calculator which computes a table of word weights based upon frequency of use in input documents.

3. The computer implemented document matcher recited in claim 2 wherein the front-end processor comprises:

a document accumulator identifying words of an input document by matching against the global dictionary of the second data structure;

a document scorer accessing the word weight table generated by the back-end processor and assigning a score to each document; and a document sorter sorting a list of matching documents with assigned scores.

4. The computer implemented document matcher recited in claim 3 wherein the document scorer scores documents by assigning a value for every matched word, adding a bonus to the value assigned for a matched word from the word weight table, and adds or subtracts a bonus or penalty for every match or mismatch in special sections of a document.

5. A computer implemented process for matching new documents to those stored in a database comprising the steps of:

generating a first data structure consisting of a set of local dictionaries of keywords;

generating a second data structure which is a global dictionary resulting from the union of all keywords in the first data structure;

computing a table of word weights based on frequency of use in input documents;

matching input documents against documents represented by said second data structure; and accessing the table of word weights, scoring input documents, and ranking stored documents by relevance scoring scheme according to a formula Base+Bonus, wherein Base is a number of keywords in document, keywords include a title and assigned keywords and Bonus is a predictive value of word, the predictive value being a number of documents in which word appears.

6. The computer implemented process recited in claim 5 further comprising the step of converting an input document to a standard representation prior to generating the first data structure.

7. The computer implemented process recited in claim 6 wherein the step of matching comprises the step of identifying words of an input document by matching against the global dictionary of the second data structure.

8. The computer implemented process recited in claim 7 wherein the step of scoring comprises the steps of:

assigning a value for every matched word;

adding a bonus to the value assigned for a matched word from the word weight table; and adding or subtracting a bonus or penalty for every match or mismatch in special sections of a document.

9. The computer implemented document matcher recited in claim 1, wherein the Bonus includes the title and special section keywords.

10. The computer implemented process recited in claim 5, wherein the Bonus includes the title and special section keywords.

* * * * *